United States Patent
Salomon et al.

(10) Patent No.: US 12,288,100 B2
(45) Date of Patent: Apr. 29, 2025

(54) WORKLOAD DISTRIBUTION BY UTILIZING UNUSED CENTRAL PROCESSING UNIT CAPACITY IN A DISTRIBUTED COMPUTING SYSTEM

(71) Applicant: Red Hat, Inc., Raleigh, NC (US)

(72) Inventors: Yehoshua Salomon, Kfar Saba (IL); Gabriel Zvi BenHanokh, Tel-Aviv (IL)

(73) Assignee: Red Hat, Inc., Raleigh, NC (US)

( * ) Notice: Subject to any disclaimer, the term of this patent is extended or adjusted under 35 U.S.C. 154(b) by 587 days.

(21) Appl. No.: 17/556,027

(22) Filed: Dec. 20, 2021

(65) Prior Publication Data

US 2023/0195527 A1 Jun. 22, 2023

(51) Int. Cl.
*G06F 9/50* (2006.01)

(52) U.S. Cl.
CPC ............ *G06F 9/505* (2013.01); *G06F 9/5044* (2013.01); *G06F 9/5077* (2013.01)

(58) Field of Classification Search
CPC ....... G06F 9/505; G06F 9/5044; G06F 9/5077
See application file for complete search history.

(56) References Cited

U.S. PATENT DOCUMENTS

| | | | |
|---|---|---|---|
| 9,304,803 B2 * | 4/2016 | Nelson | G06F 9/45558 |
| 9,888,067 B1 | 2/2018 | Yemini et al. | |
| 10,789,106 B2 | 9/2020 | Cardosa et al. | |
| 2017/0139736 A1 | 5/2017 | Messerli | |
| 2018/0060106 A1 | 3/2018 | Madtha et al. | |

OTHER PUBLICATIONS

Ferre, M.R. and Karp, S., "How Amazon ECS Manages CPU and Memory Resources," AMAZON, 2019, https://aws.amazon.com/blogs/containers/how-amazon-ecs-manages-cpu-and-memory-resources/.
"Managing Resources for Containers," Kubernetes, 2021, https://kubernetes.io/docs/concepts/configuration/manage-resources-containers/.

* cited by examiner

*Primary Examiner* — Wissam Rashid
(74) *Attorney, Agent, or Firm* — Kilpatrick Townsend & Stockton LLP

(57) ABSTRACT

A technique for improving workload distribution by utilizing unused resources in a distributed computing system is described. In one example of the present disclosure, a system can determine that a computing entity of a distributed computing system includes an unused portion of a CPU capacity. The computing entity can have a first defined limit of the CPU capacity. The system can use the unused portion of the CPU capacity to improve a usage of a resource of the computing entity. The computing entity can have a second defined limit of the resource.

15 Claims, 4 Drawing Sheets

---

402
Determine that a computing entity of a distributed computing environment includes an unused portion of a central processing unit (CPU) capacity, the computing entity having a first defined limit of the CPU capacity

404
Use the unused portion of the CPU capacity to improve a usage of a resource of the computing entity, the computing entity having a second defined limit of the resource

|  | CPU Units | Memory |
| --- | --- | --- |
| Computing Entity Limits | 8 | 64 GB |
| Workload Entity A | 2 | 32 GB |
| Workload Entity B | 4 | 40 GB |
| Unused Amount | 2 | -8 GB |
| Workload Entity A | 2 + 1 = 3 | 32 * 0.85 = 27.2 GB |
| Workload Entity B | 4 + 1 = 5 | 40 * 0.85 = 34 GB |
| Unused Amount | 0 | 2.8 GB |

Before Compression: rows 2–4 (Workload Entity A, Workload Entity B, Unused Amount)

After Compression: rows 5–7 (Workload Entity A, Workload Entity B, Unused Amount)

FIG. 2

WORKLOAD DISTRIBUTION BY UTILIZING UNUSED CENTRAL PROCESSING UNIT CAPACITY IN A DISTRIBUTED COMPUTING SYSTEM

TECHNICAL FIELD

The present disclosure relates generally to distributed computing systems. More specifically, but not by way of limitation, this disclosure relates to improving workload distribution by utilizing unused central processing unit capacity in a distributed computing system.

BACKGROUND

There are various types of distributed computing environments, such as cloud computing systems, computing clusters, and data grids. A distributed computing system can include multiple nodes (e.g., physical machines or virtual machines) in communication with one another over a network, such as a local area network or the Internet. Cloud computing systems have become increasingly popular. Cloud computing environments have a shared pool of computing resources (e.g., servers, storage, and virtual machines) that are used to provide services to users on demand. These services are generally provided according to a variety of service models, such as Infrastructure as a Service, Platform as a Service, or Software as a Service. But regardless of the service model, cloud providers manage the physical infrastructures of the cloud computing environments to relieve this burden from users, so that the users can focus on deploying software applications.

BRIEF DESCRIPTION OF THE DRAWINGS

FIG. 2 shows a chart of an example of resource capacities of a computing entity before and after compression according to some aspects of the present disclosure.

DETAILED DESCRIPTION

Figure 1:
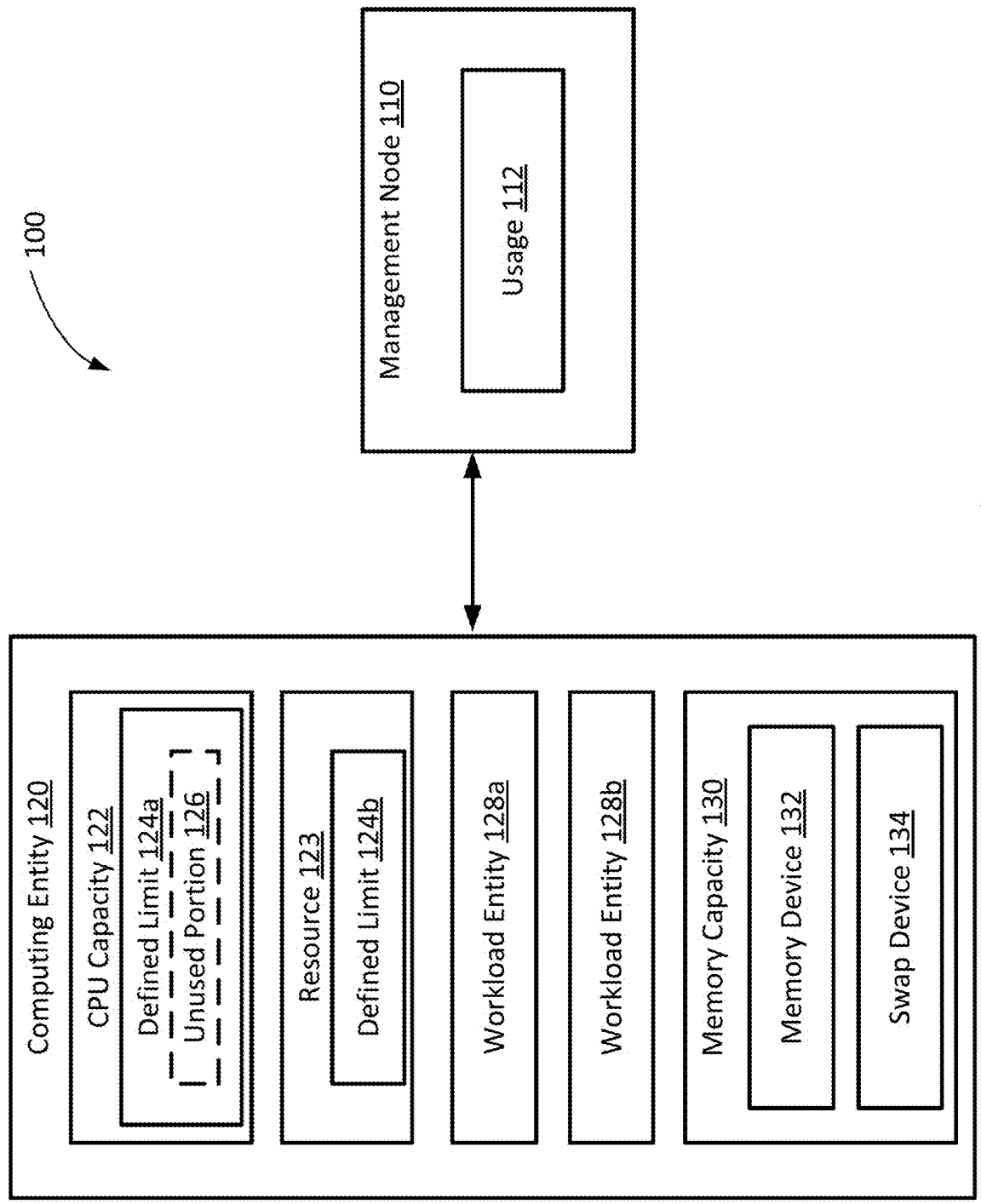
FIG. 1 shows a block diagram of an example of a system for improving workload distribution by utilizing unused central processing unit capacity in a distributed computing system according to some aspects of the present disclosure.

Computing entities, such as nodes, virtual machines, or computing instances, of distributed computing systems can be assigned workload entities to execute. The workload entities can include pods, container, or processes. A computing entity can have a fixed amount of resources, such as central processing unit (CPU) units, memory capacity, and network bandwidth. Workload entities are each associated with using particular amount of the resources. A scheduler of a management node of the distributed computing system is constrained to assigning workload entities to the computing entity based on the availability of the fixed amount of the resources. So, if only one resource of the computing entity is fully used, the scheduler cannot assign additional workload entities to the computing entity, even if other resources of the computing entity remain available. This often results in resources being unused and additional computing entities being needed to execute all desired workload entities.

Some examples of the present disclosure can overcome one or more of the abovementioned problems by providing a system that utilizes unused CPU units to improve workload distribution in a distributed computing environment. For example, a computing entity of the system can included a defined limit of CPU units and a defined limit of another resource. The system can determine that the computing entity includes an unused portion of the CPU units. The computing entity may be executing one or more workload entities, and the unused portion of the CPU units can be an amount of the CPU units that are not consumed by the one or more workload entities. The system can use the unused portion of the CPU units to improve a usage associated with the other resource. For example, the unused portion of the CPU units can be used to compress memory data, network traffic, or storage traffic. Compressing the memory data, network traffic, or storage traffic can allow an additional workload entity that previously could not be executed by the computing entity within the defined limit of the resource to fit within the defined limit. So, the CPU units and the resource can be used more fully. Additionally, fewer computing entities may be involved in executing the workload entities, which can reduce computing resource requirements of the distributed computing system.

As one example, a system can include computing entity with defined limits of CPU units and memory capacity. For example, the computing entity can include eight CPU units and sixty-four GBs of memory. The computing entity can be assigned a workload entity A uses two CPU units and thirty-two GBs of memory. The system can receive a workload entity B that uses four CPU units and forty GBs of memory. The system cannot assign both workload entity A and workload entity B to the computing entity, since executing both workload entity A and workload entity B would involve eight GBs of memory that the computing entity does not have. But, there are two CPU units of the computing entity that are unused. The system can use the two unused CPU units to compress the memory data for the workload entity A and the workload entity B. Each CPU unit may be usable for compressing memory data by 15%. So, one CPU unit of the unused CPU units can be used to compress the memory data of workload entity A into 27.2 GBs of data, and the other CPU unit of the unused CPU units can be used to compress the memory data of workload entity B into thirty-four GBs of data. As a result, the total compressed data for workload entity A and workload entity B is 61.2 GBs, which is 2.8 GBs less than the defined limit of sixty-four GBs. Therefore, by using the two unused CPU units to compress the memory data for workload entity A and the workload entity B, both of the workload entities can be executed on the computing entity. So, another computing entity is not needed for executing workload B, which reduces computing requirements of the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for improving workload distribution by utilizing unused CPU capacity in a distributed computing system according to some aspects of the present disclosure. The system 100 includes a management node 110 and a computing entity 120. The management node 110 and the computing entity 120 may be part of a distributed computing system, such as distributed storage system, a cloud computing system, or a cluster computing system. Examples of the computing entity 120 include a virtual machine (VM), a computing instance, or a node. The management node 110 and the computing entity 120 can communicate via one or more networks, such as a local area network or the Internet. The management node 110 can schedule one or more workload entities, such as pods, containers, or processes, to the computing entity 120.

To assign workload entities to computing entities, the management node 110 can take into account fixed-allotments of resources that are available for the computing entities. For example, the computing entity 120 can have CPU capacity 122 and resource 123, and each can have defined limits 124a-b. As one example, the CPU capacity 122 can be CPU units of the computing entity 120, and the resource 123 may be a memory capacity 130 of the computing entity 120. The CPU units can be virtual units and may or may not be an integer value. For example, 2.5 CPU units may be assigned to a workload entity. The memory capacity 130 can be a combined capacity of a memory device 132 of the computing entity 120 and a swap device 134 of the computing entity 120. The swap device 134 can be a portion of a storage device that can be used for storing memory data. In some examples, the resource 123 may be a network bandwidth.

Since the computing entity 120 may not be able to add to the defined limits 124a-b of the CPU capacity 122 or the resource 123, the management node 110 can assign one or more workload entities to the computing entity 120 that use, in combination, less than or equal to each of the defined limits 124a-b. As one example, the defined limit 124a for the CPU capacity 122, which is a number of CPU units, can be ten, and the defined limit 124b for the resource 123, which is the memory capacity 130, can be thirty-two GBs. The management node 110 can assign workload entities to the computing entity 120 that collectively use less than ten CPU units and thirty-two GBs of memory. Therefore, if a workload entity 128a uses four CPU units and twenty GBs of memory, and a workload entity 128b uses four CPU units and sixteen GBs of memory, the management node 110 cannot assign both of the workload entities 128a-b to the computing entity 120 because the defined limit 124b would be exceeded, even though a portion of the defined limit 124a would be unused.

When a portion of the CPU capacity 122 is unused, which can be referred to as an unused portion 126, the unused portion 126 can be used to improve a usage 112 of the computing entity 120. Specifically, the usage 112 can be associated with the resource 123. For example, if the resource 123 is the memory capacity 130, the usage 112 can be a usage of the memory capacity 130. Alternatively, if the resource 123 is a network bandwidth, the usage 112 can be correspond to data transfer associated with the network bandwidth.

To use the unused portion 126 of the CPU capacity 122, the management node 110 can initially determine that the computing entity 120 includes the unused portion 126 of the CPU capacity 122. For example, the computing entity 120 can be executing the workload entity 128a that uses four of the ten CPU units and twenty of the thirty-two GBs of memory. Upon receiving the workload entity 128b that can use four CPU units and sixteen GBs of memory, the management node 110 can determine that if the two unused CPU units are used to compress the data of the workload entities 128a-b then the workload entity 128b can be assigned to the computing entity 120 and executed by the computing entity 120 along with the workload entity 128a. The computing entity 120 can compress the data of the workload entities 128a-b such that the collective size of data for the workload entities 128a-b is less than the defined limit 124b. As a result of the compression, an unused capacity of the memory capacity 130 can be increased. The compression may be performed at a computing-entity level or at a workload-entity level. That is, the compression may be performed for all workload entities of a particular computing entity, or the compression may be performed for particular workload entities of a computing entity. The compression may be automatically initiated by the management node 110.

The swap device 134 may be used to perform the compression. So, when data is moved from the memory device 132 to the swap device 134, the swap device 134 can first compress the data, using the unused portion 126 of the CPU capacity 122, and then store the compressed data. The compression may be performed for data in the memory device 132, data in the swap device 134, or both.

In some examples, the resource 123 can be network bandwidth. The computing entity 120 can have the defined limit 124a of ten CPU units and the defined limit 124b of sixty Mbps. The computing entity 120 can be executing the workload entity 128a that uses four of the ten CPU units and forty of the sixty Mbps of network bandwidth. Upon receiving the workload entity 128b that can use four CPU units and thirty Mbps of network bandwidth, the management node 110 can determine that if the two unused CPU units are used to compress network traffic of the workload entities 128a-b, then the workload entity 128b can be assigned to the computing entity 120 and executed by the computing entity 120 along with the workload entity 128a. The computing entity 120 can compress the network traffic of the workload entities 128a-b such that data transfer for the workload entities 128a-b is improved and fits within the defined limit 124b of the network bandwidth.

A determined amount of the CPU capacity 122 may be usable for improving the usage 112 by a determined amount. For example, each CPU unit may be capable of reducing memory data for a workload entity by a determined amount, such as 15%. The management node 110 can determine whether the compression that is possible for the data given the unused portion 126 of the CPU capacity 122 is sufficient for executing the workload entities 128a-b on the computing entity 120.

Although FIG. 1 depicts a certain number and arrangement of components, other examples may include more components, fewer components, different components, or a different number of the components that is shown in FIG. 1. For instance, the system 100 can include more computing entities than are shown in FIG. 1. Additionally, while two workload entities are shown in FIG. 1, in other examples the system 100 may include more or fewer computing entities. Unused CPU capacity of each of the computing entities can be usable to improve the distribution of workload entities across the computing entities. Although FIG. 1 describes compressing memory data and network traffic, other examples may involve compressing storage traffic to improve performance of the computing entity 120 and the overall system 100.

FIG. 2 shows a chart of an example of resource capacities of a computing entity before and after compression according to some aspects of the present disclosure. The chart includes resources of CPU units and memory capacity. A computing entity, which is an example of the computing entity 120 in FIG. 1, is illustrated to have defined limits of eight CPU units and sixty-four GBs of memory.

Initially, a workload entity A uses two CPU units and thirty-two GBs of memory. A workload entity B uses four CPU units and forty GBs of memory. As a result, both workload entity A and workload entity B cannot be executed on the computing entity, since executing both workload entity A and workload entity B would involve eight GBs of memory that the computing entity does not have. But, there are two CPU units of the computing entity that are available to improve memory usage by compressing the data for the workload entity A and the workload entity B.

In FIG. 2, one CPU unit is capable of compressing the data of each workload entity by 15%. So, one CPU unit is used to compress the data of workload entity A into 27.2 GBs of data and one CPU unit is used to compress the data of workload entity B into thirty-four GBs of data. As a result, the total compressed data for workload entity A and workload entity B is 61.2 GBs, which is 2.8 GBs less than the defined limit of sixty-four GBs. Therefore, by using the two unused CPU units to compress the memory data for workload entity A and the workload entity B, both of the workload entities can be executed on the computing entity. So, another computing entity is not needed for executing workload B, which reduces computing requirements of the system.

Figure 3:
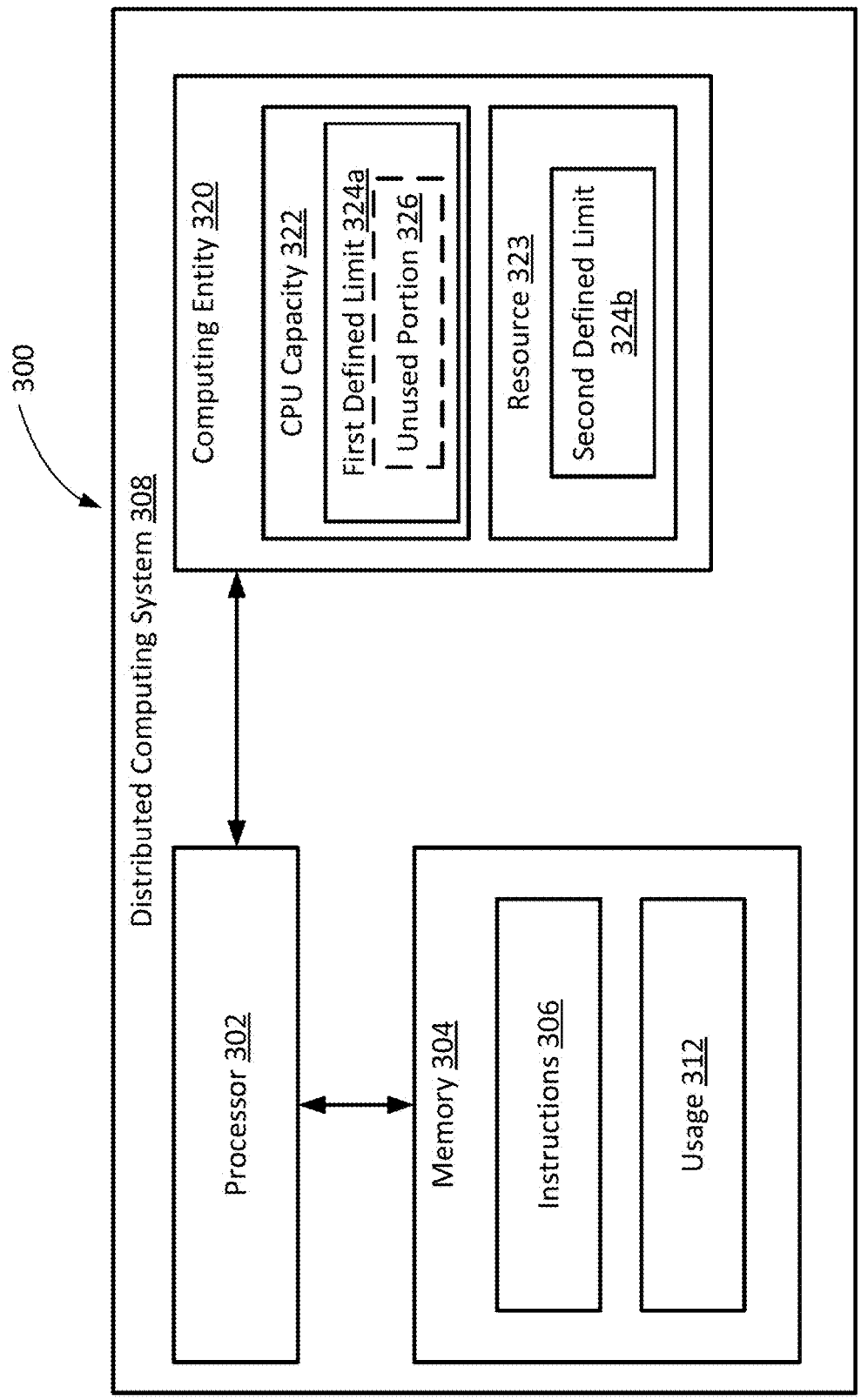
FIG. 3 shows a block diagram of an example of a system for improving workload distribution by utilizing unused central processing unit capacity in a distributed computing system according to some aspects of the present disclosure.

FIG. 3 shows a block diagram of an example of a system 300 for improving workload distribution by utilizing unused CPU capacity in a distributed computing system 308 according to some aspects of the present disclosure. The distributed computing system 308 includes a processor 302 that is communicatively coupled to a memory 304. In some examples, the processor 302 and the memory 304 can be part of the same computing device, such as management node 110 or computing entity 120 in FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), or a microprocessor. The processor 302 can execute instructions 306 stored in the memory 304 to perform operations. The instructions 306 may include processor-specific instructions generated by a compiler or an interpreter from code written in any suitable computer-programming language, such as C, C++, C#, Java, or Python.

The memory 304 can include one memory or multiple memories. The memory 304 can be volatile or non-volatile. Non-volatile memory includes any type of memory that retains stored information when powered off. Examples of the memory 304 include electrically erasable and programmable read-only memory (EEPROM) or flash memory. At least some of the memory 304 can include a non-transitory computer-readable medium from which the processor 302 can read instructions 306. A non-transitory computer-readable medium can include electronic, optical, magnetic, or other storage devices capable of providing the processor 302 with computer-readable instructions or other program code. Examples of a non-transitory computer-readable medium can include a magnetic disk, a memory chip, ROM, random-access memory (RAM), an ASIC, a configured processor, and optical storage.

The processor 302 can execute the instructions 306 to perform operations. For example, the processor 302 can determine that a computing entity 320 of the distributed computing system 308 includes an unused portion 326 of a CPU capacity 322. The computing entity 320 can have a first defined limit 324a of the CPU capacity 322. The unused portion 326 of the CPU capacity 322 can be an amount of the first defined limit 324a that is not used by executing one or more workload entities on the computing entity 320. For example, the CPU capacity 322 can be CPU units, and the unused portion 326 can be a number of CPU units that are not used in an execution of two workload entities on the computing entity 320. The processor 302 can use the unused portion 326 of the CPU capacity 322 to improve a usage 312 of a resource 323 of the computing entity 320. The computing entity 320 can have a second defined limit 324b of the resource 323.

A swap device of the computing entity 320 may be used to perform the compression. When data is moved from a memory device of the computing entity 320 to the swap device, the swap device can compress the data, using the unused portion 326 of the CPU capacity 322, and then store the compressed data. A determined amount of the CPU capacity 322 may be usable for improving the usage 312 by a determined amount. For example, one CPU unit may be usable to compress memory data, storage traffic, or network traffic by 30%. The processor 302 can determine that the unused portion 326 is sufficient for compressing enough memory data, network traffic, or storage traffic so that the second defined limit 324b is not exceeded when executing the one or more workload entities. Compressing memory data can improve the usage 312 associated with memory usage of the computing entity 320. Compressing network traffic can improve the usage 312 associated with network bandwidth. Compressing storage traffic can improve the usage 312 associated with storage-data resources. The compression may be performed at a computing-entity level or at a workload-entity level. That is, the compression may be performed for all workload entities of a particular computing entity, or the compression may be performed for particular workload entities of a computing entity. Using the unused portion 326 to improve the usage 312 can allow additional workload entities that initially utilize more of the resource 323 than is available to be utilized by the computing entity 320. As a result, the computing entity 320 can be used to its full potential and a number of sub-optimally used computing entities can be reduced in the distributed computing system 308.

Figure 4:
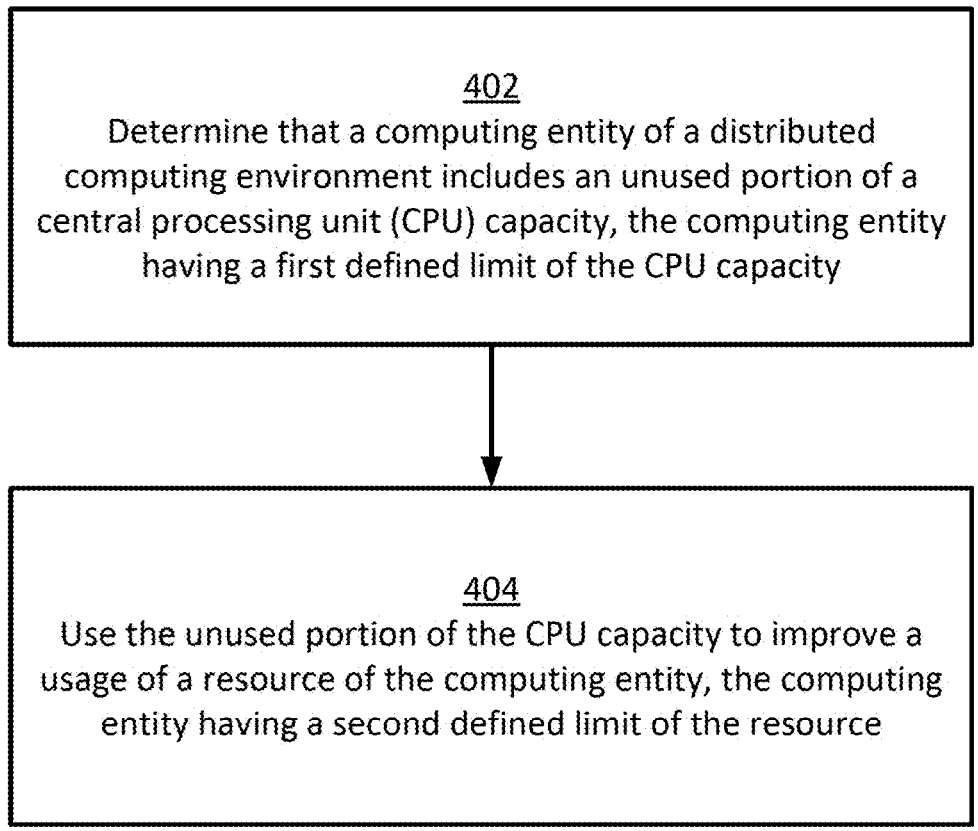
FIG. 4 shows a flow chart of an example of a process for improving workload distribution by utilizing unused central processing unit capacity in a distributed computing system according to some aspects of the present disclosure.

FIG. 4 shows a flow chart of a process for implementing dynamic expansion of a distributed computing system according to some aspects of the present disclosure. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 can determine that a computing entity 320 of a distributed computing system 308 includes an unused portion 326 of a CPU capacity 3221. The computing entity 320 can have a first defined limit 324a of the CPU capacity 322. The unused portion 326 of the CPU capacity 322 can be an amount of the first defined limit 324a that is not used by executing one or more workload entities on the computing entity 320. Examples of the computing entity 320 can include a virtual machine, a computing instance, or a node. Examples of workload entities can include a pod, a container, or a process. As an example, the CPU capacity 322 can be CPU units, and the unused portion 326 can be a number of CPU units that are not used in an execution of two containers on the computing entity 320.

In block 404, the processor 302 can use the unused portion 326 of the CPU capacity 322 to improve a usage 312 of a resource 323 of the computing entity 320. The computing entity 320 can also have a second defined limit 324b of the resource 323. The unused portion 326 may be used to compress memory data, network traffic, or storage traffic of the workload entities that are to be executed on the computing entity 320. Compressing the memory data, network traffic, or storage traffic can allow the memory data, network traffic, or storage traffic of the workload entities to fit within the second defined limit 324b. A swap device of the computing entity 320 may be used to perform the compression. A determined amount of the CPU capacity 322 may be usable for improving the usage 312 by a determined amount. For example, one CPU unit may be usable to compress memory data, storage traffic, or network traffic for a workload entity by 10%. The processor 302 can determine that the unused portion 326 is sufficient for compressing enough memory data, network traffic, or storage traffic so that the second defined limit 324b is not exceeded when executing the one or more workload entities. Compressing memory data can improve the usage 312 of the memory the computing entity 320, compressing network traffic can improve the usage 312 associated with network bandwidth, and compressing storage traffic can improve the usage 312 associated with storage-data resources. Using the unused portion 326 to improve the usage 312 can allow additional workload entities that initially utilize more of the resource 323 than is available to be executed by the computing entity 320. As a result, the computing entity 320 can be used to its full potential and a number of sub-optimally used computing entities can be reduced in the distributed computing system 308.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processor; and
   a memory including instructions that are executable by the processor for causing the processor to:
   determine that a computing entity of a distributed computing system includes an unused portion of a central processing unit (CPU) capacity, the computing entity having a first defined limit of the CPU capacity, the computing entity having a second defined limit of a resource;
   determine that the computing entity executes a first workload entity that is configured to use a first amount of the resource, the first amount corresponding to the second defined limit;
   receive a second workload entity that is configured to use a second amount of the resource;
   subsequent to receiving the second workload entity, use the unused portion of the CPU capacity to improve a usage of the resource of the computing entity by freeing up the second amount of the resource, a first determined amount of the CPU capacity being usable for improving the usage of the resource by a second determined amount; and
   execute the second workload entity on the computing entity.

2. The system of claim 1, wherein the CPU capacity comprises a plurality of CPU units, the resource comprises a memory capacity of the computing entity, and the memory further includes instructions that are executable by the processor for causing the processor to use the unused portion of the CPU capacity to improve the usage of the resource by:
   using the unused portion of the plurality of CPU units to compress a size of data stored in a memory device of the computing entity; and
   in response to compressing the size of data stored in the memory device, increasing an unused capacity of the memory device.

3. The system of claim 2, wherein the memory capacity comprises a first capacity of the memory device and a second capacity of a swap device and the memory further includes instructions that are executable by the processor for causing the processor to compress the size of data in the swap device using the swap device.

4. The system of claim 1, wherein the CPU capacity comprises a plurality of CPU units, the resource comprises a memory capacity of the computing entity, and the memory further includes instructions that are executable by the processor for causing the processor to use the unused portion of the CPU capacity to improve the usage of the resource by:
   using the unused portion of the plurality of CPU units to compress a size of data stored in a swap device of the computing entity; and
   in response to compressing the size of data stored in the swap device, increasing an unused capacity of the swap device.

5. The system of claim 1, wherein the CPU capacity comprises a plurality of CPU units, the resource comprises a network bandwidth, and the memory further includes instructions that are executable by the processor for causing the processor to use the unused portion of the CPU capacity to improve the usage of the resource by:
   using the unused portion of the plurality of CPU units to compress a size of network traffic of the computing entity; and
   in response to compressing the size of the network traffic, improving data transfer associated with the network bandwidth.

6. The system of claim 1, wherein the computing entity comprises a virtual machine, a computing instance, or a node, the resource comprises a capacity of a memory device or a network bandwidth, and the first workload entity and the second workload entity comprise a pod, a container, or a process.

7. A method comprising:
   determining, by a processor, that a computing entity of a distributed computing system includes an unused portion of a central processing unit (CPU) capacity, the computing entity having a first defined limit of the CPU capacity, the computing entity having a second defined limit of a resource;
   determining, by the processor, that the computing entity executes a first workload entity that is configured to use a first amount of the resource, the first amount corresponding to the second defined limit;
   receiving, by the processor, a second workload entity that is configured to use a second amount of the resource;
   subsequent to receiving the second workload entity, using, by the processor, the unused portion of the CPU capacity to improve a usage of the resource of the computing entity by freeing up the second amount of the resource a first determined amount of the CPU capacity being usable for improving the usage of the resource by a second determined amount; and executing, by the processor, the second workload entity on the computing entity.

8. The method of claim 7, wherein the CPU capacity comprises a plurality of CPU units, the resource comprises a memory capacity of the computing entity, and the method further comprises using the unused portion of the CPU capacity to improve the usage of the resource by:

using, by the processor, the unused portion of the plurality of CPU units to compress a size of data stored in a memory device of the computing entity; and in response to compressing the size of data stored in the memory device, increasing, by the processor, an unused capacity of the memory device.

9. The method of claim 8, wherein the memory capacity comprises a first capacity of the memory device and a second capacity of a swap device and the method further comprises compressing, by the processor, the size of data in the swap device using the swap device.

10. The method of claim 7, wherein the CPU capacity comprises a plurality of CPU units, the resource comprises a memory capacity of the computing entity, and the method further comprises using the unused portion of the CPU capacity to improve the usage of the resource by:

using the unused portion of the plurality of CPU units to compress a size of data stored in a swap device of the computing entity; and in response to compressing the size of data stored in the swap device, increasing an unused capacity of the swap device.

11. The method of claim 7, wherein the CPU capacity comprises a plurality of CPU units, the resource comprises a network bandwidth, and the method further comprises using the unused portion of the CPU capacity to improve the usage of the resource by:

using, by the processor, the unused portion of the plurality of CPU units to compress a size of network traffic of the computing entity; and in response to compressing the size of the network traffic, improving, by the processor, data transfer associated with the network bandwidth.

12. The method of claim 7, wherein the computing entity comprises a virtual machine, a computing instance, or a node, the resource comprises a capacity of a memory device or a network bandwidth, and the first workload entity and the second workload entity comprise a pod, a container, or a process.

13. A non-transitory computer-readable medium comprising program code executable by a processor for causing the processor to:

determine that a computing entity of a distributed computing system includes an unused portion of a central processing unit (CPU) capacity, the computing entity having a first defined limit of the CPU capacity, the computing entity having a second defined limit of a resource;

determine that the computing entity executes a first workload entity that is configured to use a first amount of the resource, the first amount corresponding to the second defined limit;

receive a second workload entity that is configured to use a second amount of the resource;

subsequent to receiving the second workload entity, use the unused portion of the CPU capacity to improve a usage of the resource of the computing entity by freeing up the second amount of the resource a first determined amount of the CPU capacity being usable for improving the usage of the resource by a second determined amount; and execute the second workload entity on the computing entity.

14. The non-transitory computer-readable medium of claim 13, wherein the CPU capacity comprises a plurality of CPU units, the resource comprises a memory capacity of the computing entity, and further comprising program code executable by the processor for causing the processor to use the unused portion of the CPU capacity to improve the usage of the resource by:

using the unused portion of the plurality of CPU units to compress a size of data stored in a memory device of the computing entity; and in response to compressing the size of data stored in the memory device, increasing an unused capacity of the memory device.

15. The non-transitory computer-readable medium of claim 13, wherein the CPU capacity comprises a plurality of CPU units, the resource comprises a memory capacity of the computing entity, and further comprising program code executable by the processor for causing the processor to use the unused portion of the CPU capacity to improve the usage of the resource by:

using the unused portion of the plurality of CPU units to compress a size of data stored in a swap device of the computing entity; and in response to compressing the size of data stored in the swap device, increasing an unused capacity of the swap device.

* * * * *